(12) United States Patent
Faynberg et al.

(10) Patent No.: US 8,370,509 B2
(45) Date of Patent: Feb. 5, 2013

(54) IDENTITY MANAGEMENT SERVICES PROVIDED BY NETWORK OPERATOR

(75) Inventors: Igor Faynberg, East Brunswick, NJ (US); Hui-Lan Lu, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 111 days.

(21) Appl. No.: 12/437,248

(22) Filed: May 7, 2009

(65) Prior Publication Data

US 2010/0262703 A1 Oct. 14, 2010

Related U.S. Application Data

(60) Provisional application No. 61/168,057, filed on Apr. 9, 2009.

(51) Int. Cl.
*G06F 15/16* (2006.01)
(52) U.S. Cl. ............... 709/229; 709/203; 726/3; 726/4; 726/5; 726/6; 726/7; 726/8; 726/9; 726/10; 726/11; 726/12; 726/13
(58) Field of Classification Search ............... 726/3–13; 709/203, 229
See application file for complete search history.

(56) References Cited

U.S. PATENT DOCUMENTS

| | | | |
|---|---|---|---|
| 7,788,493 B2 * | 8/2010 | Mononen et al. | 713/170 |
| 2007/0204168 A1 * | 8/2007 | Cameron et al. | 713/185 |
| 2007/0294431 A1 * | 12/2007 | Adelman et al. | 709/245 |
| 2008/0127320 A1 * | 5/2008 | De Lutiis et al. | 726/9 |
| 2010/0011421 A1 * | 1/2010 | Chari et al. | 726/5 |
| 2011/0010762 A1 * | 1/2011 | Nijdam et al. | 726/5 |
| 2011/0030043 A1 * | 2/2011 | Jones et al. | 726/7 |
| 2011/0202986 A1 * | 8/2011 | Horn et al. | 726/7 |
| 2011/0265155 A1 * | 10/2011 | Liu | 726/5 |

FOREIGN PATENT DOCUMENTS

WO PCT/US2010/027808 1/2011

OTHER PUBLICATIONS

"Secure Hash Standard," Federal Information Processing Standards Publication 180-2, Aug. 1, 2002, 75 pages.
3rd Generation Partnership Project; Technical Specification Group Core Network and Terminals; "Characteristics of the Universal Subscriber Identity Module (USIM) Application," Release 7, 3GPP TS 31.102, Version 7.3.0, Dec. 2005, 177 pages.

(Continued)

*Primary Examiner* — Duyen Doan
(74) *Attorney, Agent, or Firm* — Ryan, Mason & Lewis, LLP (57) ABSTRACT

Techniques are disclosed for enabling operators of communication networks to provide one or more identity services such as, for example, an authentication service. For example, in a communication network, assume that a first computing device is a client device, a second computing device is an application server, and a third computing device is a server under control of an operator of the communication network. A method may comprise the following steps. In response to the first computing device issuing a resource request to the second computing device and the first computing device providing a first identifier to the second computing device for use in authenticating the first computing device to the second computing device, and in response to the second computing device being unable to authenticate the first computing device, the third computing device assisting in the authentication of the first computing device to the second computing device when a correlation exists between the first identifier sent by the first computing device and a second identifier used by the first computing device to access the communication network as a subscriber, wherein the second computing device is able to reply to the resource request sent by the first computing device upon a successful authentication assisted by the third party computing device.

26 Claims, 4 Drawing Sheets

OTHER PUBLICATIONS

3rd Generation Partnership Project; Technical Specification Group Core Network and Terminals; "Characteristics of the IP Multimedia Services Identity Module (ISIM) Application," Release 5, 3GPP TS 31.103, Version 5.10.0, Jun. 2005, 26 pages.

3rd Generation Partnership Project; Technical Specification Group Services and System Aspects; "3G Security; Security Architecture," 3G TS 33.102, Version 3.1.0, Jul. 1999, 57 pages.

3rd Generation Partnership Project; Technical Specification Group Core Network; "Cx and Dx Interfaces Based on the Diameter Protocol; Protocol Details," Release 5, 3GPP TS 29.229, Version 5.10.0, Mar. 2005, 23 pages.

"OpenID Authentication 2.0—Final," http://openid.net/specs/openid-authentication-2_0.html, Dec. 2007, 46 pages.

A. Niemi et al., "Hypertext Transfer Protocol (HTTP) Digest Authentication Using Authentication and Key Agreement (AKA)," Network Working Group, RFC 3310, Sep. 2002, pp. 1-18.

V. Torvinen et al., "Hypertext Transfer Protocol (HTTP) Digest Authentication Using Authentication and Key Agreement (AKA)," Network Working Group, RFC 4169, Version 2, Nov. 2005, pp. 1-13.

J. Franks et al., "HTTP Authentication: Basic and Digest Access Authentication," Network Working Group, RFC 2617, Jun. 1999, pp. 1-34.

H. Krawczyk et al., "HMAC: Keyed-Hashing for Message Authentication," Network Working Group, RFC 2104, Feb. 1997, pp. 1-11.

"NGN Identity Management Framework," International Telecommunication Union, ITU-T Recommendation Y.2720, Series Y: Global Information Infrastructure, Internet Protocol Aspects and Next-Generation Networks, Jan. 2009, 30 pages.

P. Weik et al., "Towards a Generic Identity Enabler for Telco Networks," 12th International Conference on Intelligent Service Delivery Networks, Oct. 2008, 6 pages, Cirencester, United Kingdom.

* cited by examiner

FIG. 4
400

IDENTITY MANAGEMENT SERVICES PROVIDED BY NETWORK OPERATOR

CROSS REFERENCE TO RELATED APPLICATION

The present application claims priority to the U.S. Provisional Patent Application identified as Ser. No. 61/168,057, filed on Apr. 9, 2009, the disclosure of which is incorporated by reference herein in its entirety.

FIELD OF THE INVENTION

The present invention relates generally to communication networks, and more particularly to communication networks wherein identity services are provided by network operators.

BACKGROUND

This section introduces aspects that may help facilitate a better understanding of the inventions. Accordingly, the statements of this section are to be read in this light and are not to be understood as admissions about what is prior art or what is not prior art.

According to the International Telecommunication Union-Telecommunication Standardization Sector (ITU-T), by way of example, a Next Generation Network (NGN) is a packet-based network able to provide services including telecommunication services and able to make use of multiple broadband, quality-of-service (QoS)-enabled transport technologies and in which service-related functions are independent from underlying transport-related technologies. It may offer unrestricted access by users to different service providers. It may support generalized mobility which may allow consistent and ubiquitous provision of services to users.

Furthermore, the ITU-T has developed an Identity Management (IdM) Standard for such Internet Protocol (IP)-based Next Generation Networks (NGN). ITU-T Recommendation Y.2720 entitled "NGN Identity Management Framework" is such a standard, and specifies an IdM framework.

SUMMARY

Embodiments of the invention provide techniques for enabling operators of communication networks to provide one or more identity services such as, for example, an authentication service.

In a first aspect, wherein it is assumed that, in a communication network, a first computing device is a client device, a second computing device is an application server, and a third computing device is a server under control of an operator of the communication network, a method comprises the following steps.

In response to the first computing device issuing a resource request to the second computing device and the first computing device providing a first identifier to the second computing device for use in authenticating the first computing device to the second computing device, and in response to the second computing device being unable to authenticate the first computing device, the third computing device assisting in the authentication of the first computing device to the second computing device when a correlation exists between the first identifier sent by the first computing device and a second identifier used by the first computing device to access the communication network as a subscriber, wherein the second computing device is able to reply to the resource request sent by the first computing device upon a successful authentication assisted by the third party computing device.

In one or more illustrative embodiments, the method may further comprise the following steps.

The second computing device causes the first computing device to send an authentication request to the third computing device, wherein the third computing device receives the authentication request from the first computing device.

The third computing device checks for a correlation between the first identifier sent by the first computing device and the second identifier used by the first computing device to access the communication network as a subscriber.

When the correlation exists, the third computing device sends an authentication challenge to the first computing device.

In response to the first computing device sending an authentication response to the third computing device based on the authentication challenge, the third computing device attempts to verify the authentication response.

When the authentication response is verified, the third computing device sends an authentication result to the first computing party, wherein the authentication result is cryptographically signed using a key agreed upon between the third computing device and the second computing device, such that the first computing device can then send the signed authentication result to the second computing device and, when the signed authentication result is verified, the second computing device can reply to the resource request sent by the first computing device.

Further, in one or more illustrative embodiments, the first identifier of the first computing device may comprise an open source-based identifier such as an OpenID identifier. The first computing device may execute a web client, the second computing device may be a relying party, and the third computing device may be an identity provider. The first computing device may support a Subscriber Identity Module (SIM) application that implements an Authentication and Key Agreement (AKA) algorithm. The second identifier may be provisioned by a network operator and comprise an International Mobile Subscriber Identity (IMSI) identifier or an Internet Protocol Multimedia Private User Identity (IMPI) identifier.

Still further, in one or more illustrative embodiments, the third computing device may receive from a fourth computing device information associated with a user of the first computing device such that the third computing device performs challenge-response interactions with the first computing device based on the information. The challenge-response interactions may be in accordance with an AKA-aware challenge-response protocol (e.g., RFC 3310 or RFC 4169). The fourth computing device may be a Home Location Register (HLR) or a Home Subscriber Server (HSS). The information received from the HLR or HSS may comprise an authentication vector. The authentication vector may be generated in accordance with an AKA algorithm.

Yet further, in one or more illustrative embodiments, the third computing device may monitor a frequency of authentication requests to determine an existence of a denial of service (DOS) condition, and may cause one or more actions to be taken to mitigate the DOS condition, when the condition is determined to exist.

Advantageously, illustrative embodiments of the invention provide for a gateway-like entity (e.g., identity provider) in a communication network of a network operator which interworks or integrates an open source identification standard with one or more network security protocols, thus providing enablement of an identity provision function by the network operator.

These and other features and advantages of the present invention will become more apparent from the accompanying drawings and the following detailed description.

DETAILED DESCRIPTION OF THE INVENTION

It is realized that the Identity Management (IdM) concept can enable new services by operators of communications networks, e.g., telecom operators or network operators (note that these two phrases may be used interchangeably herein). Examples of such operators may include but are not limited to AT&T, Verizon, NTT, China Mobile, France Telecom/Orange. Indeed, since it is realized that telecom operators "own" network access, they "own" much information connected with their subscribers. In this respect, ownership may include: (1) the ability to authenticate (and, when necessary, authorize) the subscribers—properly and efficiently; (2) actual ownership of subscriber data; and, (3) established trust with subscribers. Accordingly, as used herein, a "network operator" (or "telecom operator") is defined as a company that owns and operates a telecommunications network and thus provides services to subscribers, e.g., an NGN operator is a network operator that owns and operates an NGN network. Thus, two defining features of a network operator may be: (1) owning the network; and (2) providing services to subscribers, for a charge. A third feature may be that the network operators are typically regulated, which may make them legally responsible for ensuring privacy of communications, etc.

Based on those assets, it is realized that telecom operators are in a unique position to offer a range of identity-based services—from home networking to straight-forward authentication services for enterprise, to a complex blend of services, including, by way of example only, financial and medical transactions. Conversely, it is also realized that by federating data from multiple application providers, coupled with single sign-on, telecom operators can offer unique mash-up services to their subscribers.

It is further realized that, within the above-cited framework provided by ITU-T Recommendation Y.2720 entitled "NGN Identity Management Framework," the disclosure of which is incorporated herein by reference in its entirety, various Web 2.0 technologies can be made to interwork with the NGN technologies such as the Universal Mobile Telecommunications System (UMTS) or IP Multimedia Subsystem (IMS) or the like. It is realized that such an identity management framework, as outlined by ITU-T Recommendation Y.2720, may take into account that: (i) end users are increasingly using multiple identities; (ii) these identities may be associated with differing contexts and service privileges; (iii) the identities may only partially identify the end user; and (iv) the identities may be used anywhere, anytime.

In one embodiment, it is realized that an open-community (open source) identity standard, referred to as OpenID, may be used as an interworking function between such Web 2.0 technologies and NGN technologies.

OpenID is an open, decentralized, free framework for user-centric digital identity, see website www.openid.net. That is, OpenID allows users to log onto many services with the same digital identity. As such, it replaces the common login process that uses a login-name and a password. OpenID takes advantage of already existing internet technology (i.e., Uniform Resource Identifier—URI, HyperText Transport Protocol—HTTP, Secure Socket Layer protocol—SSL, Diffie-Hellman protocol) and realizes that individuals create identities for themselves on various websites. OpenID allows one to transform one of these existing URIs into an account which can be used at sites which support OpenID logins. OpenID is managed by the OpenID Foundation (San Ramon, Calif.). The standard is described in detail in OpenID Authentication 2.0 and OpenID Provider Authentication Policy Extension 1.0, the disclosures of which are incorporated by reference herein in their entirety.

While this particular embodiment utilizes aspects of the OpenID standard and specification, it is to be understood that OpenID is one example of an open source identification standard and an open source-based identifier that may be used. Thus, other suitable identification standards that provide similar facilities and features as OpenID may be considered as being within the scope of embodiments of the invention.

Accordingly, illustrative principles of the invention provide for a variety of features and advantages including but not limited to:

1. The end-user to issue his or her own OpenID identifiers, which are bound to the 3GPP (Third Generation Partnership Project) subscriber identifier such as International Mobile Subscriber Identity (IMSI) or IP Multimedia Private user Identity (IMPI) issued by the NGN operator (such as, by way of example only, AT&T or Verizon);

2. The end-user to benefit from the services associated with OpenID backed by NGN operators in the same way he or she enjoys them today when OpenID is backed by Web 2.0 providers (e.g., Yahoo! or VeriSign) while relying on the traditional level of trust associated with the NGN operators;

3. The NGN operator to use said level of trust to offer a seemingly infinite variety of new Web 2.0 services (such as, by way of example only, payment, social networking, or health-care services) and generate appropriate revenues from advertising, payment percentages and so on;

4. The NGN operator to ensure that the security aspects of said services (such as, by way of example only, confidentiality, privacy, and non-repudiation) are backed by the proven UMTS or IMS security mechanisms, which are reused without any modification;

5. Ensuring modularity and backward compatibility, as neither the end-user, nor the existing NGN operator's software need be modified. Instead, a new stand-alone entity (which, by way of example, in one embodiment, can be a software object or module; in another embodiment, a hardware component; and in yet another embodiment, a combination of software and hardware) maintains the new software, which effectively interworks with existing software and equipment;

6. Ensuring simplicity of implementation by using the bare minimum functional capability set present in the NGN; and 7. Mitigating denial of service (DOS) attacks against the NGN.

Figure 1:
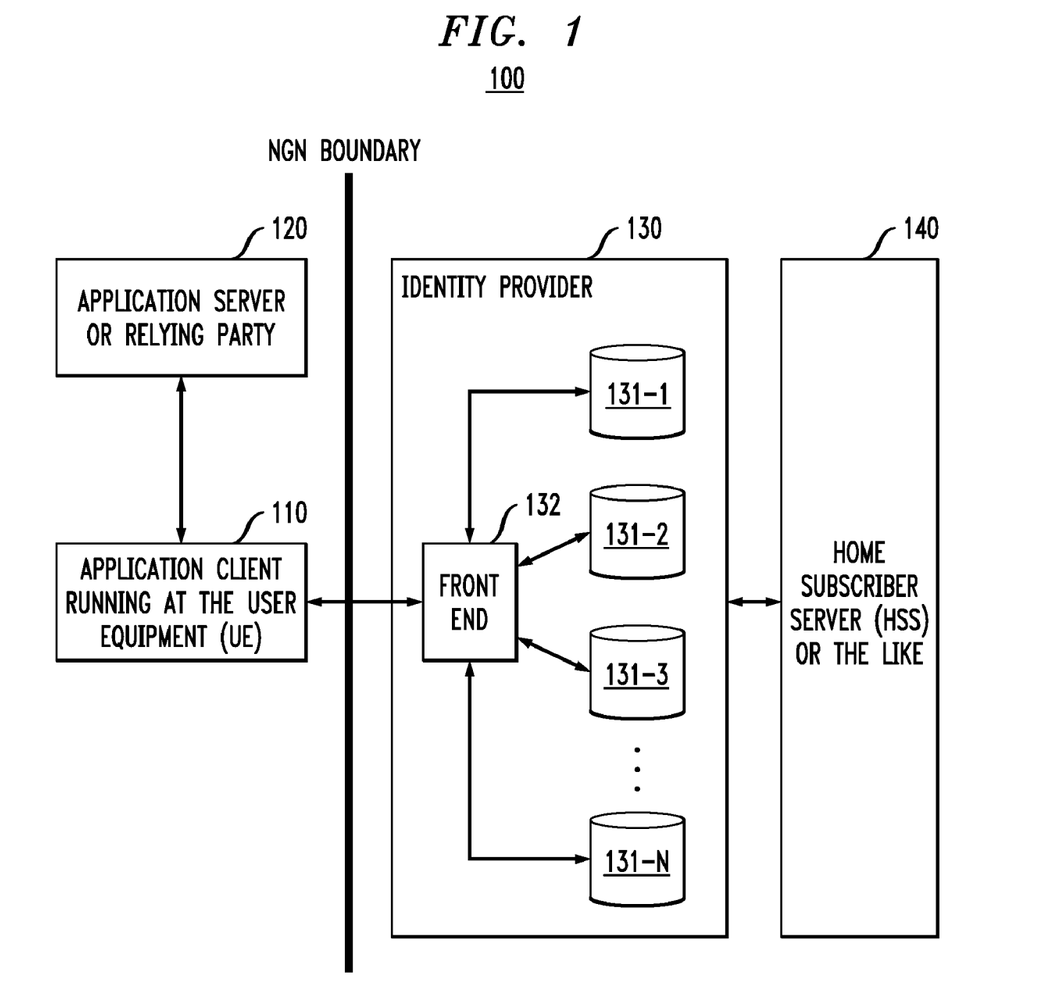
FIG. 1 is a diagram of a communication network within which identity services can be provided by a network operator, according to one embodiment of the invention.

FIG. 1 depicts a communication network 100 within which identity services can be provided by a network operator, according to one embodiment of the invention.

As shown, user equipment 110 executes a Web browser (such as, by way of example only, Microsoft Internet Explorer or Firefox), or some other application-specific client software (such as instant messaging client or Voice-over-IP client), through which the end-user accesses an application (such as, by way of example only, payment, social networking, or health care services). The user equipment can be, by way of example, a mobile telephone, a portable computer, a wireless email device, a personal digital assistant (PDA) or some other user communication device.

In one embodiment, the UE application client 110 is assumed to support an application protocol that is aware of the Authentication and Key Agreement (AKA) algorithm, e.g., RFC 3310: "Hypertext Transfer Protocol (HTTP) Digest Authentication Using Authentication and Key Agreement (AKA)," September 2002, the disclosure of which is incorporated by reference herein in its entirety; or RFC 4169: "Hypertext Transfer Protocol (HTTP) Digest Authentication Using Authentication and Key Agreement (AKA) Version-2," November 2005, the disclosure of which is incorporated by reference herein in its entirety. Furthermore, in this illustrative embodiment, the UE is assumed to support a Subscriber Identity Module (SIM) application that implements the AKA algorithm. Details on SIM applications may be found in 3GPP Technical Specifications TS 31.102 and TS 31.103, the disclosures of which are incorporated by reference herein in their entirety. Details on AKA may also be found in is 3GPP Technical Specification TS 33.102, the disclosure of which is incorporated by reference herein in its entirety.

While this particular embodiment utilizes aspects of a 3GPP authentication protocol, it is to be understood that such a protocol is one example of a security protocol that may be used. Thus, other suitable security protocols that provide similar facilities and features as the 3GPP authentication protocol may be considered as being within the scope of embodiments of the invention.

As further shown in FIG. 1, a relying party 120, which is an application on one or more web servers (application server), is assumed to provide a particular application or service (such as, by way of example only, payment, social networking, or health care services) and to support OpenID (e.g., in this particular embodiment).

An identity provider (IdP) 130 is also shown, which is effectively a gateway entity to the operator network within its boundary. An example of such a network is an IMS network managed by a network operator such as AT&T or Verizon. That is, the identity provider entity is controlled and operated by the network operator. It should be noted, again, that an implementation of the identity provider entity may actually contain a given number of servers (131-1 through 131-n) with such function, whose load is balanced under the supervision of a front-end server 132. It is also the function of the front-end server 132 to ensure that the system functions (although with degraded performance) under denial of service (DOS) conditions by keeping at least one server acting on "good" requests (i.e., legitimate requests and not requests that are intended to be part of the DOS attack).

In one embodiment, the identity provider 130 is assumed to support OpenID and AKA-aware HTTP or the like on the user side, and a Diameter-based protocol (e.g., details of which are described in 3GPP Technical Specification TS 29.229, the disclosure of which is incorporated by reference herein in its entirety) for retrieving certain authentication vectors from a Home Subscriber Server (HSS) 140 or the like on the operator side. The authentication vectors are generated by the HSS or the like based on the AKA algorithm (e.g., TS 33.102).

The Home Location Register (HLR) or Home Subscriber Server (HSS) 140, or the like, stores the end-user profiles (which include the 3GPP subscriber identifiers and associated shared secrets) and can, upon request, generate AKA authentication vectors.

In one embodiment, a software module or software object, which executes the interworking function according to illustrative principles of the invention, resides only in the identity provider entity, and so, isolates the authentication procedures in only one point. It is to be appreciated that, in one embodiment, the identity provider is a software module (such as a process running under supervision of any operating system, such as, by way of example only, Linux or Unix), which can be co-located with any other NGN operator's software executing on one (central case) server or several (distributed case) servers (e.g., 131-1 through 131-n, 132, or other servers not shown) in the operator's network. It is also to be appreciated that the protocol executed by this software module supports overload control and load balancing.

Figure 2:
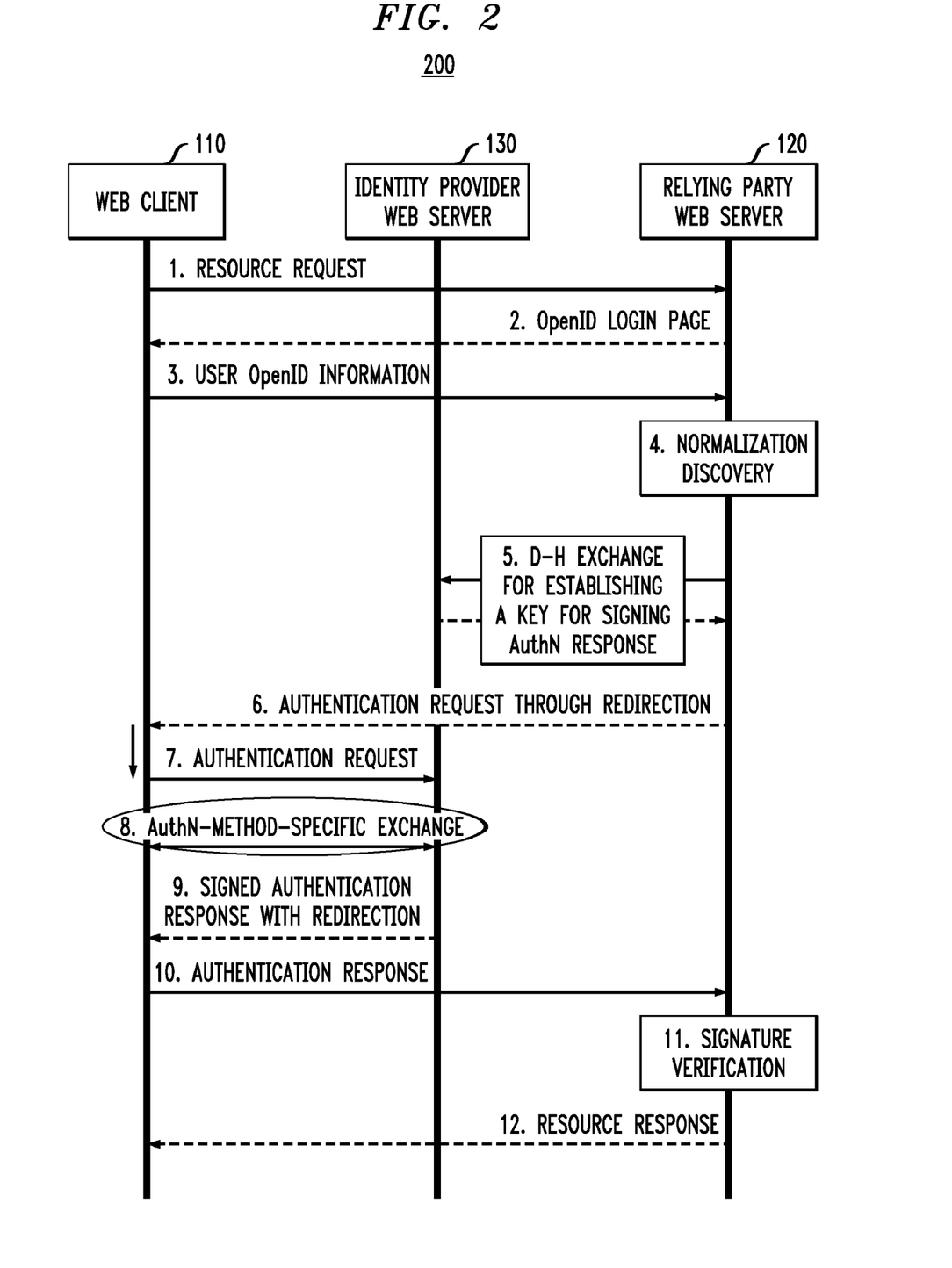
FIG. 2 is a diagram of a work flow for an application scenario involving an open source identification standard, according to one embodiment of the invention.

FIG. 2 depicts work flow 200 for an application scenario involving OpenID, according to one embodiment of the invention. Note that the first request (step 1), the last response (step 12), and the authentication-method-specific exchange (step 8) are not part of the OpenID standard; while the other steps, in this embodiment, may operate (albeit, in some cases, modified as specifically described below) in accordance with the above-mentioned OpenID standard.

It is to be understood that the messages sent between the entities shown in FIG. 2 (and in FIG. 3 to be described below) are signals that are transmitted and received in accordance with the one or more communication protocols that are implemented by the entities. It is also to be understood that the sequence of the message transfers can be rearranged or modified (with some additional messages being added and/or some being deleted) while still providing one or more of the advantages attributable to the principles of the invention.

In step 1, web client 110 (i.e., application client executing at user equipment) sends a resource request to the relying party 120 (i.e., web server executing the application or service that the end user wishes to access, e.g., payment, social networking, or health care services).

In step 2, the relying party 120 sends the OpenID login page to the web client 110.

In step 3, the web client 110 sends its OpenID information (i.e., OpenID identifier) to the relying party 120. It is to be appreciated that the OpenID identifier may include information entered by the user of the web client 110, information stored on the user equipment, or both.

In step 4, a normalization discovery procedure is performed in accordance with the OpenID standard. In general, the normalization discovery procedure effectively corrects the identifier provided by the web client if there is any informality in the standard format.

In step 5, a Diffie-Hellman exchange is performed between the relying party 120 and the identity provider 130. This is part of the OpenID standard and is used to establish a key for signing an authentication response to be sent from the identity provider 130 to the web client 110. In accordance with principles of the invention, the identity provider may advantageously comprise one or more web servers operated by network operator.

In step 6, the relying party 120 sends a redirection response to the web client 110. The response carries an OpenID authentication request to the identity provider 130.

In step 7, the web client 110 forwards the authentication request to the identity provider 130.

In step 8, an authentication-method-specific exchange is performed between the web client 110 and the identity provider 130. It is to be appreciated that one embodiment of this authentication-method-specific exchange is shown and will be described in the context of FIG. 3.

In step 9, the identity provider 130 sends a redirection response with a signed authentication response.

In step 10, the web client 110 forwards the signed authentication response to the relying party 120.

In step 11, a signature verification procedure is performed by the relying party 120.

In step 12, the relying party 120 sends the web client 110 a resource response (i.e., a response to the original resource request sent by the web client in step 1).

Figure 3:
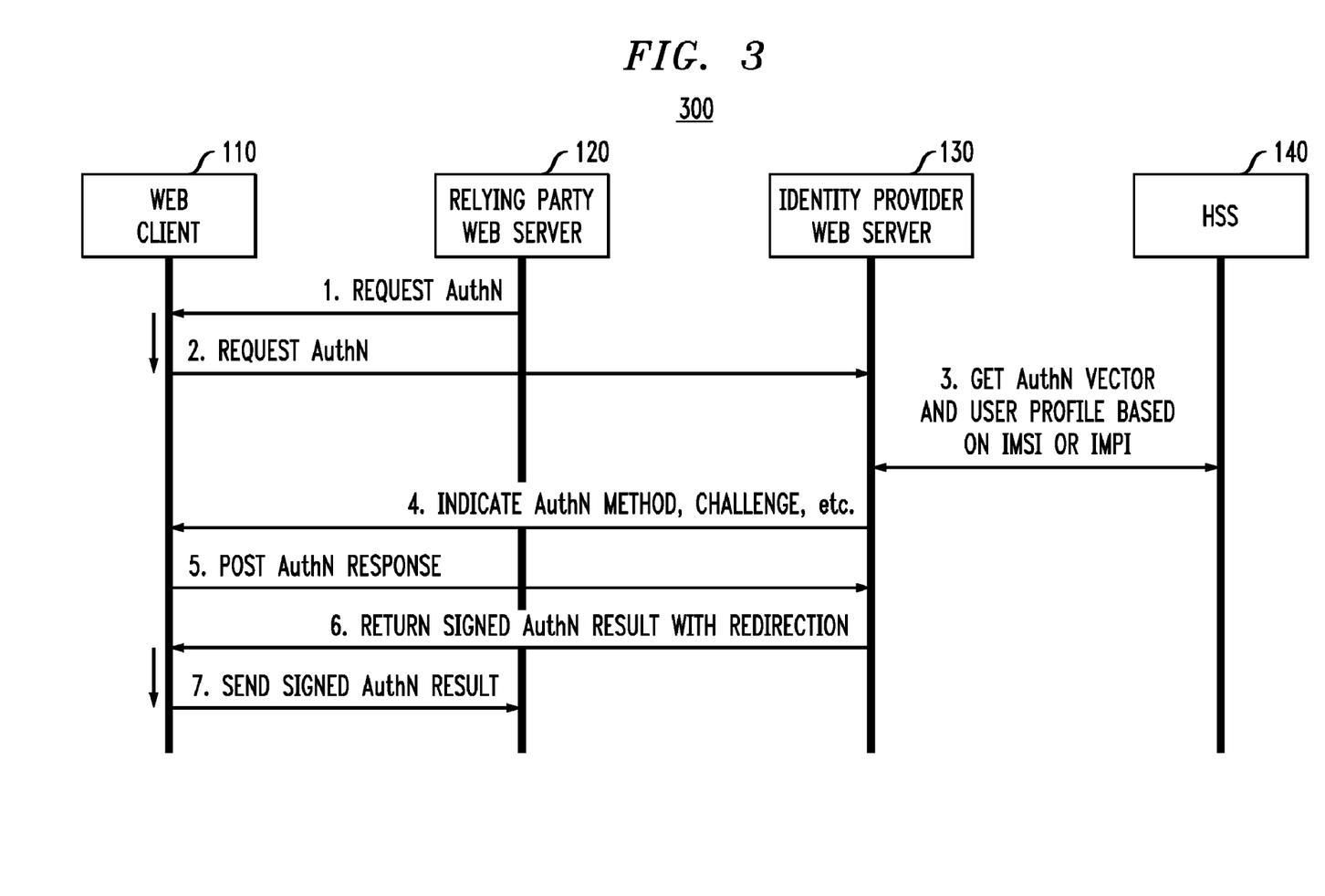
FIG. 3 is a diagram of a work flow for an authentication-method-specific exchange, according to an embodiment of the invention.

FIG. 3 depicts work flow 300 for the authentication-method-specific exchange (e.g., step 8 in FIG. 2). In particular, FIG. 3 is a generic AKA-based work flow which broadly defines a generic family of protocols in support of web services via HTTP, Session Initiation Protocol—SIP, or a variety of other application protocols that use the construct of HTTP digest (i.e., RFC 2617, the disclosure of which is incorporated by reference herein in its entirety) or Hash-based Message Authentication Code—HMAC (i.e., RFC 2104, the disclosure of which is incorporated by reference herein in its entirety).

In step 1, unable to authenticate the user (web client 110) by itself, the relying party 120 causes the user to obtain authentication from the identity provider 130. This can be achieved by using a method such as HTTP REDIRECT, but it can also be achieved by using a native application method. In either case, this method is carried in the abstract Request-Authn request.

The RequestAuthn request causes the client at the UE, on its reception, to direct, in step 2, such a request, possibly accompanied by additional self-identifying information elements, to the identity provider 130.

The identity provider 130 checks the information in the message and attempts to correlate the claimed user identifier with the IMPI or IMSI (i.e., 3GPP subscriber identifier). If there is such correlation, the identity provider 130, in step 3, obtains from the HSS 140 (or the like) the authentication vector, which includes the necessary challenge to authenticate the UE client and the pre-computed answer to this challenge.

If there is no correlation possible, the procedure is aborted, which can be accomplished by sending a reject message or simply ignoring the initial request (a step that may have a security advantage). The identity provider 130 also examines the frequency of requests (especially ones with the wrong data, which must be logged) on the subject of discovering a DOS attack. When such frequency exceeds a set threshold, measures such as offloading, changing of IP address, to mitigate the DOS attack, along with the active measures to block the suspected traffic at the gateway to the network, are taken. It should be noted, again, that an implementation of the identity provider 130 entity may actually contain a number of servers with such function, whose load is balanced under the supervision of a front-end server. It is also the function of the front-end server to ensure that the system functions (although with degraded performance) under DOS by keeping at least one server acting on "good" requests (as explained above).

In step 4, if all is well (e.g., assuming successful receipt of the appropriate authentication information from the HSS), the identity provider 130 passes the authentication method and the authentication vector (which includes a challenge and network authenticator, i.e., a value presented by the identity provider for authentication purpose) to the web client 110 at the UE.

The web client 110 at the UE authenticates the identity provider 130, computes the answer and the necessary cryptographic session keys (i.e., a cipher key and an integrity-protection key), and computes a quantity that can be included in the response to the identity provider 130 to authenticate itself. The quantity could be a digest of the 3GPP user identity (IMPI or IMSI), a combination of the answer and session keys, and other elements such as specified in RFC 3310 or RFC 4169. Alternatively, the quantity could be a keyed message authentication code computed over the same elements as in the digest computation. In this case, the signing key is the concatenation of the session keys and the algorithm is HMAC-SHA256 (RFC 2104, FIPS 180-2, the disclosures of which are incorporated by reference herein in their entirety).

In step 5, the web client 110 provides the response to the identity provider 130.

At this point, the identity provider 130 verifies that the response is consistent with the authentication vector. If this is not the case, the actions of step 3, including the detection of DOS, are performed. Otherwise, the identity provider 130 prepares the final authentication result, signs it for the relying party 120 according to the OpenID standard, and returns the signed result to the web client at the UE with the redirection to the relying party, in step 6.

In step 7, the web client 110 re-sends the authenticator to the relying party 120, which, upon verification of the signature, admits the client to use the appropriate service.

It is to be appreciated that all or parts of the authentication procedure between the web client and the identity provider may be transparent to the user using the equipment. However, this is not required, i.e., the user may be made aware of the exchanges between the web client and the identity provider.

Figure 4:
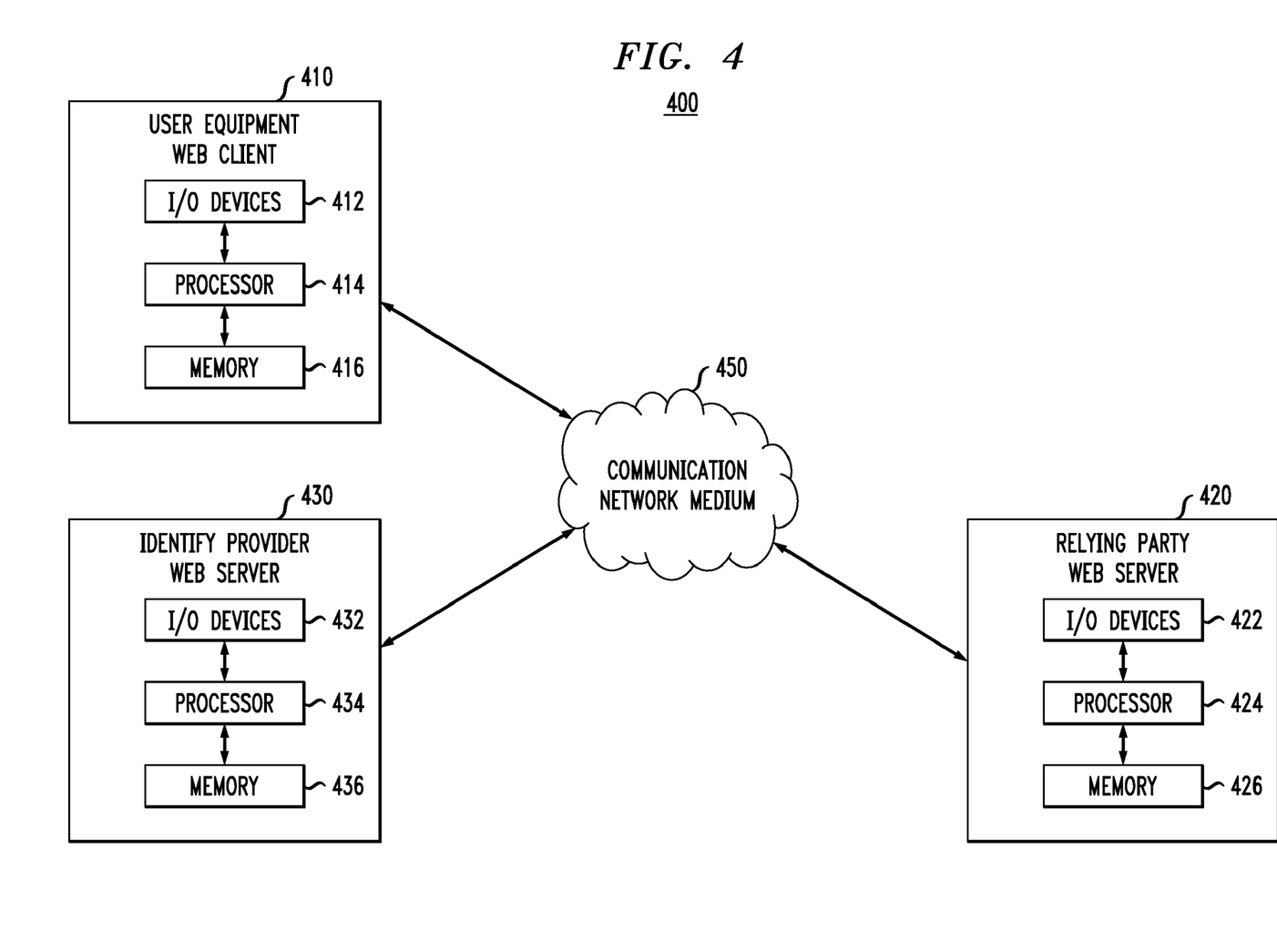
FIG. 4 is a diagram of a hardware architecture of a communication network suitable for implementing identity services, according to an embodiment of the invention.

Lastly, FIG. 4 illustrates a generalized hardware architecture of a communication network 400 suitable for implementing identity services (including authentication procedures) according to the above-described principles of the invention.

As shown, user equipment 410 (e.g., corresponding to web client 110), web server 420 (e.g., corresponding to relying party 120), and web server 430 (e.g., corresponding to identity provider 430) are operatively coupled via communication network medium 450. The network medium may be any network medium across which the user equipment and the web servers desire to communicate. By way of example, the network medium can carry IP packets end to end and may involve UMTS or WiFi or DSL (Digital Subscriber Line) in the access network, Ethernet in the metro network, and MPLS (Multiprotocol Label Switching) in the backbone. However, the invention is not limited to a particular type of network medium. Typically, user equipment 410 could be a client machine and web servers 420 and 430 could be server machines. Not expressly show here, but understood to be operatively coupled to identity provider 420, is HSS server 140 (which can have the same processor/memory configuration described below).

As would be readily apparent to one of ordinary skill in the art, the servers and clients may be implemented as programmed computers operating under control of computer program code. The computer program code would be stored in a computer (or processor or machine) readable storage medium (e.g., a memory) and the code would be executed by a processor of the computer. Given this disclosure of the invention, one skilled in the art could readily produce appropriate computer program code in order to implement the protocols described herein.

Nonetheless, FIG. 4 generally illustrates an exemplary architecture for each device communicating over the network medium. As shown, user equipment 410 comprises I/O devices 412, processor 414, and memory 416. Relying party web server 420 comprises I/O devices 422, processor 424, and memory 426. Identity provider web server 430 comprises I/O devices 432, processor 434, and memory 436.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU. That is, each computing device (410, 420, and 430) shown in FIG. 4 may be individually programmed to perform their respective steps of the protocols depicted in FIGS. 2 and 3.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
in a communication network wherein a first computing device is a client device, a second computing device is an application server, and a third computing device is a server under control of an operator of the communication network, and in response to the first computing device issuing a resource request to the second computing device and the first computing device providing a first identifier to the second computing device for use in authenticating the first computing device to the second computing device, and in response to the second computing device being unable to authenticate the first computing device;
the third computing device assisting in the authentication of the first computing device to the second computing device when a correlation exists between the first identifier sent by the first computing device and a second identifier used by the first computing device to access the communication network as a subscriber, wherein, upon a successful authentication exchange between the first computing device and the third computing device comprising a pre-computed challenge and response, the third computing device sending a cryptographically-signed authentication result to the first computing device with redirection to the second computing device, such that the first computing device can then send the cryptographically-signed authentication result to the second computing device and the second computing device is able to reply to the resource request sent by the first computing device.

2. The method of claim 1, wherein the step of the third computing device assisting in the authentication of the first computing device to the second computing device further comprises the third computing device receiving an authentication request from the first computing device.

3. The method of claim 2, wherein the step of the third computing device assisting in the authentication of the first computing device to the second computing device further comprises the third computing device checking for the correlation between the first identifier sent by the first computing device and the second identifier used by the first computing device to access the communication network as a subscriber.

4. The method of claim 3, wherein the step of the third computing device assisting in the authentication of the first computing device to the second computing device further comprises, when the correlation exists, the third computing device sending an authentication challenge to the first computing device.

5. The method of claim 4, wherein the step of the third computing device assisting in the authentication of the first computing device to the second computing device further comprises, in response to the first computing device sending an authentication response to the third computing device based on the authentication challenge, the third computing device attempting to verify the authentication response.

6. The method of claim 5, wherein the step of the third computing device assisting in the authentication of the first computing device to the second computing device further comprises, when the authentication response is verified by the third computing device, the third computing device sending a signed authentication result to the first computing party, wherein the first computing device can then send the signed authentication result to the second computing device and, when the signed authentication result is verified, the second computing device can reply to the resource request sent by the first computing device.

7. The method of claim 6, wherein the signed authentication result sent by the third computing device to the first computing device is cryptographically signed using a key agreed upon between the third computing device and the second computing device.

8. The method of claim 1, wherein the first identifier of the first computing device comprises an open source-based identifier.

9. The method of claim 8, wherein the open source-based identifier is an OpenID identifier.

10. The method of claim 9, wherein the first computing device executes a web client, the second computing device is a relying party, and the third computing device is an identity provider.

11. The method of claim 1, wherein the first computing device supports a Subscriber Identity Module (SIM) application that implements an Authentication and Key Agreement (AKA) algorithm.

12. The method of claim 1, wherein the second identifier comprises an identifier provisioned by the network operator including an International Mobile Subscriber Identity (IMSI) identifier or Internet Protocol Multimedia Private User Identity (IMPI) identifier.

13. The method of claim 1, further comprising the third computing device receiving from a fourth computing device information associated with a user of the first computing device such that the third computing device performs challenge-response interactions with the first computing device based on the information.

14. The method of claim 13, wherein the fourth computing device is a Home Location Register (HLR) or a Home Subscriber Server (HSS).

15. The method of claim 13, wherein the challenge-response interactions are in accordance with an Authentication and Key Agreement (AKA)-aware challenge-response protocol.

16. The method of claim 13, wherein the information comprises an authentication vector.

17. The method of claim 16, wherein the authentication vector is generated in accordance with an Authentication and Key Agreement (AKA) protocol.

18. The method of claim 1, further comprising the third computing device monitoring a frequency of authentication requests to determine an existence of a denial of service (DOS) condition.

19. The method of claim 18, further comprising the third computing device causing one or more actions to be taken to mitigate the DOS condition, when the condition is determined to exist.

20. An article of manufacture comprising a non-transitory processor-readable storage medium storing one or more software programs which when executed by a processor:
in a communication network wherein a first computing device is a client device, a second computing device is an application server, and a third computing device is a server under control of an operator of the communication network, and in response to the first computing device issuing a resource request to the second computing device and the first computing device providing a first identifier to the second computing device for use in authenticating the first computing device to the second computing device, and in response to the second computing device being unable to authenticate the first computing device;
the third computing device assisting in the authentication of the first computing device to the second computing device when a correlation exists between the first identifier sent by the first computing device and a second identifier used by the first computing device to access the communication network as a subscriber, wherein, upon a successful authentication exchange between the first computing device and the third computing device comprising a pre-computed challenge and response, the third computing device sending a pre-signed authentication result to the first computing device with redirection to the second computing device, such that the first computing device can then send the cryptographically-signed authentication result to the second computing device and the second computing device is able to reply to the resource request sent by the first computing device.

21. A method, comprising:
in a communication network wherein a first computing device is a client device, a second computing device is an application server, and a third computing device is a server of an operator of the communication network;
in response to the first computing device issuing a resource request to the second computing device and the first computing device providing a first identifier to the second computing device for use in authenticating the first computing device, and in response to the second computing device being unable to authenticate the first computing device and causing the first computing device to send an authentication request to the third computing device, the third computing device receiving the authentication request from the first computing device;
the third computing device checking for a correlation between the first identifier sent by the first computing device and a second identifier used by the first computing device to access the communication network as a subscriber;
when the correlation exists, the third computing device sending an authentication challenge to the first computing device;
in response to the first computing device sending an authentication response to the third computing device based on the authentication challenge, the third computing device attempting to verify the authentication response; and
when the authentication response is verified, the third computing device sending an authentication result to the first computing device with redirection to the second computing device, wherein the authentication result is cryptographically signed using a key agreed upon between the third computing device and the second computing device, such that the first computing device can then send the signed authentication result to the second computing device and, when the signed authentication result is verified, the second computing device can reply to the resource request sent by the first computing device.

22. Apparatus, comprising:
at least one server under control of an operator of a communication network, the communication network comprising a client device and an application server, the at least one network operator controlled server comprising:
a memory; and
a processor coupled to the memory and configured to:
in response to: (i) the client device issuing a resource request to the application server and the client device providing a first identifier to the application server for use in authenticating the client device, and (ii) the application server being unable to authenticate the client device;
assist in the authentication of the client device to the application server when a correlation exists between the first identifier sent by the client device and a second identifier used by the client device to access the communication network as a subscriber;
wherein, upon a successful authentication exchange between the client device and the at least one network controlled server comprising a pre-computed challenge and response, the at least one network controlled server sending a cryptographically-signed authentication result to the client device with redirection to the application server, such that the client device can then send the cryptographically-signed authentication result to the application server;
wherein the application server is able to reply to the resource request sent by the client device.

23. A method, comprising:
in a communication network wherein a first computing device is a client device, a second computing device is an application server, and a third computing device is a server under control of an operator of the communication network;
the first computing device issuing a resource request to the second computing device;
the first computing device providing a first identifier to the second computing device for use in authenticating the first computing device to the second computing device, wherein, when the second computing device is unable to authenticate the first computing device, the third computing device being invoked to assist in the authentication of the first computing device, the third computing device being able to assist in the authentication when a correlation exists between the first identifier sent by the first computing device and a second identifier used by the first computing device to access the communication network as a subscriber, wherein, upon a successful authentication exchange between the first computing device and the third computing device comprising a pre-computed challenge and response, the third computing device sending a cryptographically-signed authentication result to the first computing device with redirection to the second computing device, such that the first computing device then sends the cryptographically-signed authentication result to the second computing device, and wherein the second computing device is able to reply to the resource request sent by the first computing device.

24. A method, comprising:

in a communication network wherein a first computing device is a client device, a second computing device is an application server, and a third computing device is a server under control of an operator of the communication network;

the second computing device receiving a resource request issued by the first computing device;

the second computing device receiving a first identifier from the first computing device for use in authenticating the first computing device to the second computing device; and in response to the second computing device being unable to authenticate the first computing device, the second computing device invoking the assistance of the third computing device in the authentication of the first computing device, the third computing device being able to assist in the authentication when a correlation exists between the first identifier sent by the first computing device and a second identifier used by the first computing device to access the communication network as a subscriber;

wherein, upon a successful authentication exchange between the first computing device and the third computing device comprising a pre-computed challenge and response, and the third computing device sending a cryptographically-signed authentication result to the first computing device with redirection to the second computing device, such that the first computing device then sends the cryptographically-signed authentication result to the second computing device;

the second computing device replying to the resource request sent by the first computing device.

25. A system, comprising:

a web client;

a first web server for providing access to an application by the web client, the first web server acting as a relying party in accordance with an open source based identification protocol; and a second web server controlled by an operator of a telecommunication network, the network operator server acting as an identity provider in accordance with the open source based identification protocol;

wherein the second web server assists in authenticating the web client to the relying party using an authentication and key agreement based protocol, and wherein, upon a successful authentication exchange between the web client and the second web server comprising a pre-computed challenge and response, the second web server sending a cryptographically-signed authentication result to the web client with redirection to the relying party, such that the web client can then send the cryptographically-signed authentication result to the relying party.

26. The system of claim 22, wherein the open source based identification protocol comprises an OpenID specification.

* * * * *